United States Patent
Chen et al.

(10) Patent No.: US 7,990,315 B2
(45) Date of Patent: Aug. 2, 2011

(54) SHARED MEMORY DEVICE APPLIED TO FUNCTIONAL STAGES CONFIGURED IN A RECEIVER SYSTEM FOR PROCESSING SIGNALS FROM DIFFERENT TRANSMITTER SYSTEMS AND METHOD THEREOF

(75) Inventors: Chun-Nan Chen, Taipei (TW); Jui-Ming Wei, Tai-Chung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1036 days.

(21) Appl. No.: 11/768,205

(22) Filed: Jun. 26, 2007

(65) Prior Publication Data

US 2008/0071995 A1 Mar. 20, 2008

Related U.S. Application Data

(60) Provisional application No. 60/825,755, filed on Sep. 15, 2006.

(51) Int. Cl.
*G01S 19/33* (2010.01)
*G01S 19/32* (2010.01)
*G06F 12/00* (2006.01)

(52) U.S. Cl. ............... 342/357.73; 342/357.72; 711/147
(58) Field of Classification Search ............ 342/357.72, 342/357.73, 357.77
See application file for complete search history.

(56) References Cited

U.S. PATENT DOCUMENTS

| 5,877,724 A * | 3/1999 | Davis ..................... 342/357.4 |
| 5,923,287 A | 7/1999 | Lennen |
| 6,002,363 A * | 12/1999 | Krasner ................. 342/357.77 |
| 6,278,404 B1 | 8/2001 | Niles |
| 6,526,322 B1 * | 2/2003 | Peng et al. ............ 342/357.77 |
| 6,930,634 B2 | 8/2005 | Peng et al. |
| 2003/0005214 A1 * | 1/2003 | Chan ......................... 711/104 |
| 2003/0088741 A1 | 5/2003 | Peng et al. |
| 2005/0094744 A1 | 5/2005 | Ramachandran |
| 2005/0261785 A1 | 11/2005 | Peng et al. |

FOREIGN PATENT DOCUMENTS

TW 520434 2/2003

* cited by examiner

*Primary Examiner* — Thomas H Tarcza
*Assistant Examiner* — Fred H Mull
(74) *Attorney, Agent, or Firm* — Winston Hsu; Scott Margo

(57) ABSTRACT

A shared memory device for a receiver system is disclosed. The receiver system is configured to have a first functional stage and a second functional stage for processing information carried by signals from a first transmitter system and a second transmitter system respectively. The shared memory device has a memory space, allocated to be commonly shared by the first functional stage and the second functional stage, for buffering processing data generated from the first functional stage or the second functional stage.

16 Claims, 8 Drawing Sheets

SHARED MEMORY DEVICE APPLIED TO FUNCTIONAL STAGES CONFIGURED IN A RECEIVER SYSTEM FOR PROCESSING SIGNALS FROM DIFFERENT TRANSMITTER SYSTEMS AND METHOD THEREOF

CROSS REFERENCE TO RELATED APPLICATIONS

This application claims the benefit of U.S. Provisional Application No. 60/825,755, which was filed on Sep. 15, 2006 and is included herein by reference.

BACKGROUND

The present invention relates to a memory allocation mechanism, and more particularly, to a shared memory architecture, including one or more shared memory devices, applied to functional stages configured in a receiver system for processing signals from different transmitter systems (e.g., GNSS systems) and method thereof.

Please refer to FIG. 1. FIG. 1 is a block diagram illustrating a first conventional global navigation satellite system (GNSS) receiver 10. The GNSS receiver 10 supports a single GNSS system, and comprises an antenna 12 for receiving RF signals from satellites, an RF front end 14 for converting incoming RF signals into analog IF signals, an analog-to-digital converter (ADC) 16 for converting the incoming analog IF signals into digital IF signals, a plurality of functional stages 18a, 18b, 18c, and a plurality of memory devices 20a, 20b, 20c allocated to the respective functional stages 18a, 18b, 18c. The functional stage 18a is configured to perform correlation processing to provide correlation information; the functional stage 18b is configured to perform acquisition/tracking processing for ascertaining identities of the satellites and obtaining positioning information carried by signals transmitted from the identified satellites; and the functional stage 18c is configured to perform positioning/navigation processing for determining the position of the GNSS receiver 10 according to positioning information from the preceding functional stage 18b. Since details of the conventional GNSS receiver 10 have been disclosed in U.S. Pat. No. 6,526,322, and operations of the GNSS system are well known to those skilled in this art, further description is omitted here for the sake of brevity. As shown in FIG. 1, a dedicated memory device is assigned to each functional stage. In other words, the memory device 20a is configured to buffer processing data of the functional stage 18a only; the memory device 20b is configured to buffer processing data of the functional stage 18b only; and the memory device 20c is configured to buffer processing data of the functional stage 18c only.

Please refer to FIG. 2. FIG. 2 is a block diagram illustrating a second conventional GNSS receiver 30. The GNSS receiver 30 supports multiple GNSS systems (e.g., GPS, Galileo, and GLONASS), and comprises an antenna 32, an RF front end 34, an ADC 36, a plurality of functional stages 38a, 39a, 40a performing correlation processing, a plurality of functional stages 38b, 39b, 40b performing acquisition/tracking processing, a plurality of functional stages 38c, 39c, 40c performing positioning/navigation processing, and a plurality of memory devices 42a, 42b, 42c, 43a, 43b, 43c, 44a, 44b, 44c allocated to the respective functional stages 38a-38c, 39a-39c, 40a-40c. The architecture of the GNSS receiver 30 supporting multiple GNSS systems is based upon the architecture shown in FIG. 1. The components of the same name in FIG. 1 and FIG. 2 have identical operation and functionality, and further description is omitted for brevity. In the GNSS receiver 30, a signal processing chain including the functional stages 38a, 38b, 38c is implemented for processing signals from the first GNSS system (e.g., GPS), a signal processing chain including the functional stages 39a, 39b, 39c is implemented for processing signals from the second GNSS system (e.g., Galileo), and a signal processing chain including the functional stages 40a, 40b, 40c is implemented for processing signals from the third GNSS system (e.g., GLONASS). Similarly, regarding the GNSS receiver 30 supporting multiple GNSS systems, a dedicated memory device is still assigned to each functional stage. Therefore, the size and cost of the GNSS receiver 10 is unable to be reduced efficiently due to the inefficient memory allocation scheme.

Please refer to FIG. 3. FIG. 3 is a block diagram illustrating a third conventional GNSS receiver 50. The GNSS receiver 50 supports a single GNSS system, and comprises an antenna 52, an RF front end 54, an ADC 56, a plurality of functional stages 58a, 58b, 58c performing correlation processing, acquisition/tracking processing and positioning/navigation processing respectively, and a single memory device 60 commonly shared by the functional stages 58a, 58b, 58c. The internal allocation of the shared memory space in the memory device 60 for the functional stages 58a, 58b, 58c is pre-defined and fixed. Further description has been detailed in U.S. Pat. No. 6,526,322, and is omitted here for brevity. Compared to the architecture shown in FIG. 1, the GNSS receiver 50 has an improved memory allocation scheme. If the architecture shown in FIG. 3 is followed to design a GNSS receiver supporting multiple GNSS systems, a plurality of memory devices are required for respective GNSS systems.

Please refer to FIG. 4. FIG. 4 is a block diagram illustrating a fourth conventional GNSS receiver 70. The GNSS receiver 70 supports multiple GNSS systems (e.g., GPS, Galileo, and GLONASS), and comprises an antenna 72, an RF front end 74, an ADC 76, a plurality of functional stages 78a, 79a, 80a performing correlation processing, a plurality of functional stages 78b, 79b, 80b performing acquisition/tracking processing, a plurality of functional stages 78c, 79c, 80c performing positioning/navigation processing, and a plurality of memory devices 82a, 82b, 82c allocated to the respective functional stages 78a-78c, 79a-79c, 80a-80c. The components of the same name in FIG. 3 and FIG. 4 have identical operation and functionality, and further description is omitted here for brevity. Because a memory device shown in FIG. 3 is only shared by functional stages for the same GNSS system, the designer of the GNSS receiver 70 has to allocate a memory device dedicated to each GNSS system.

SUMMARY OF THE INVENTION

It is therefore one of the objectives of the claimed invention to provide a shared memory architecture, including one or more memory devices, applied to functional stages configured in a receiver system for processing signals from different transmitter systems (e.g., GNSS systems) and method thereof.

According to one aspect of the present invention, a shared memory device for a receiver system is disclosed. The receiver system includes a first functional stage and a second functional stage for processing information carried by signals from a first transmitter system and a second transmitter system respectively. The shared memory device comprises a memory space, allocated to be commonly shared by the first functional stage and the second functional stage, for buffering processing data generated from the first functional stage or the second functional stage.

According to another aspect of the present invention, a memory management method applied to a receiver system is disclosed. The method includes configuring the receiver system to have a first functional stage and a second functional stage for processing information carried by signals from a first transmitter system and a second transmitter system respectively; allocating a memory space to be commonly shared by the first functional stage and the second functional stage; and buffering processing data generated from the first functional stage or the second functional stage into the memory space.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
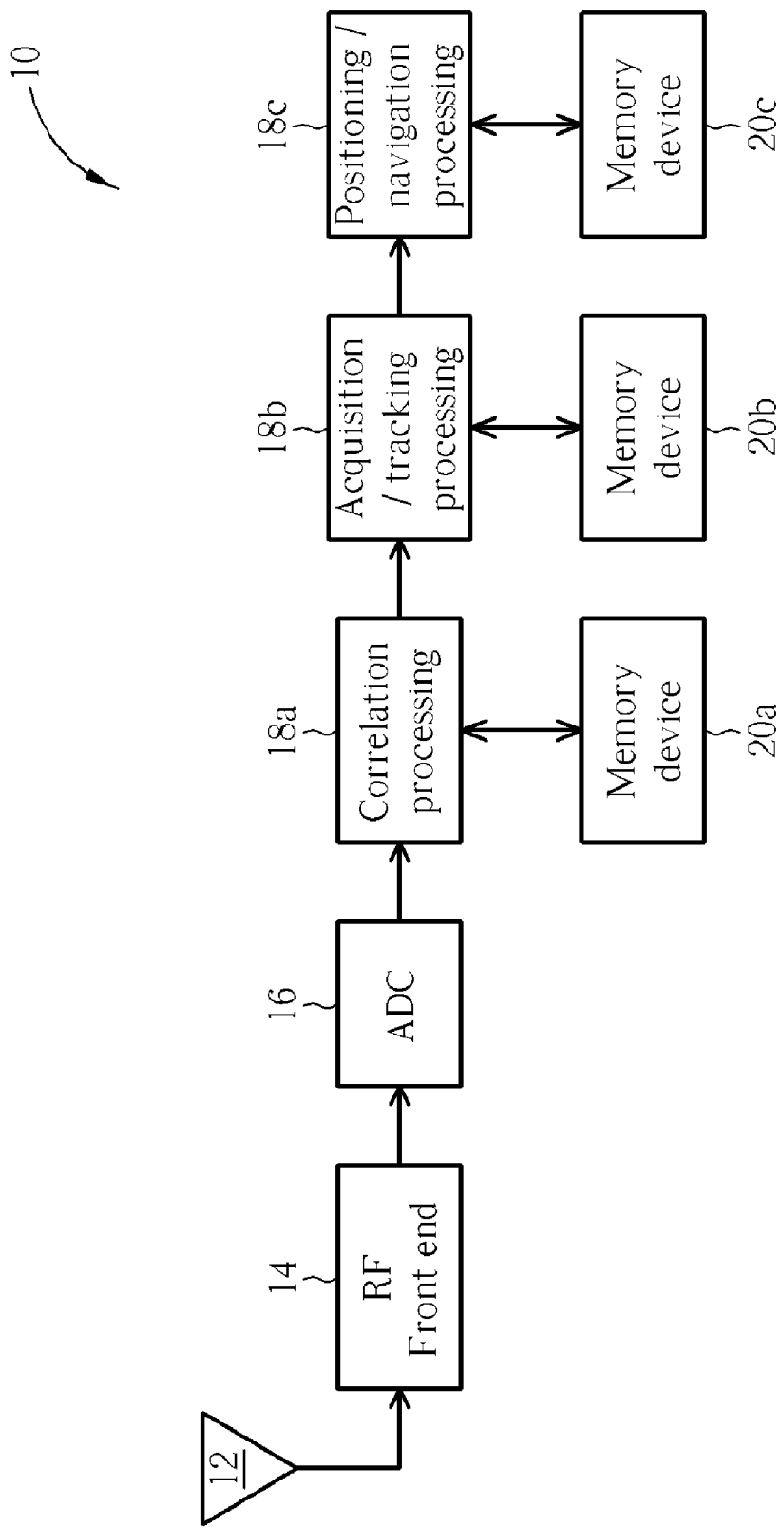
FIG. 1 is a block diagram illustrating a first conventional global navigation satellite system (GNSS) receiver.
Figure 2:
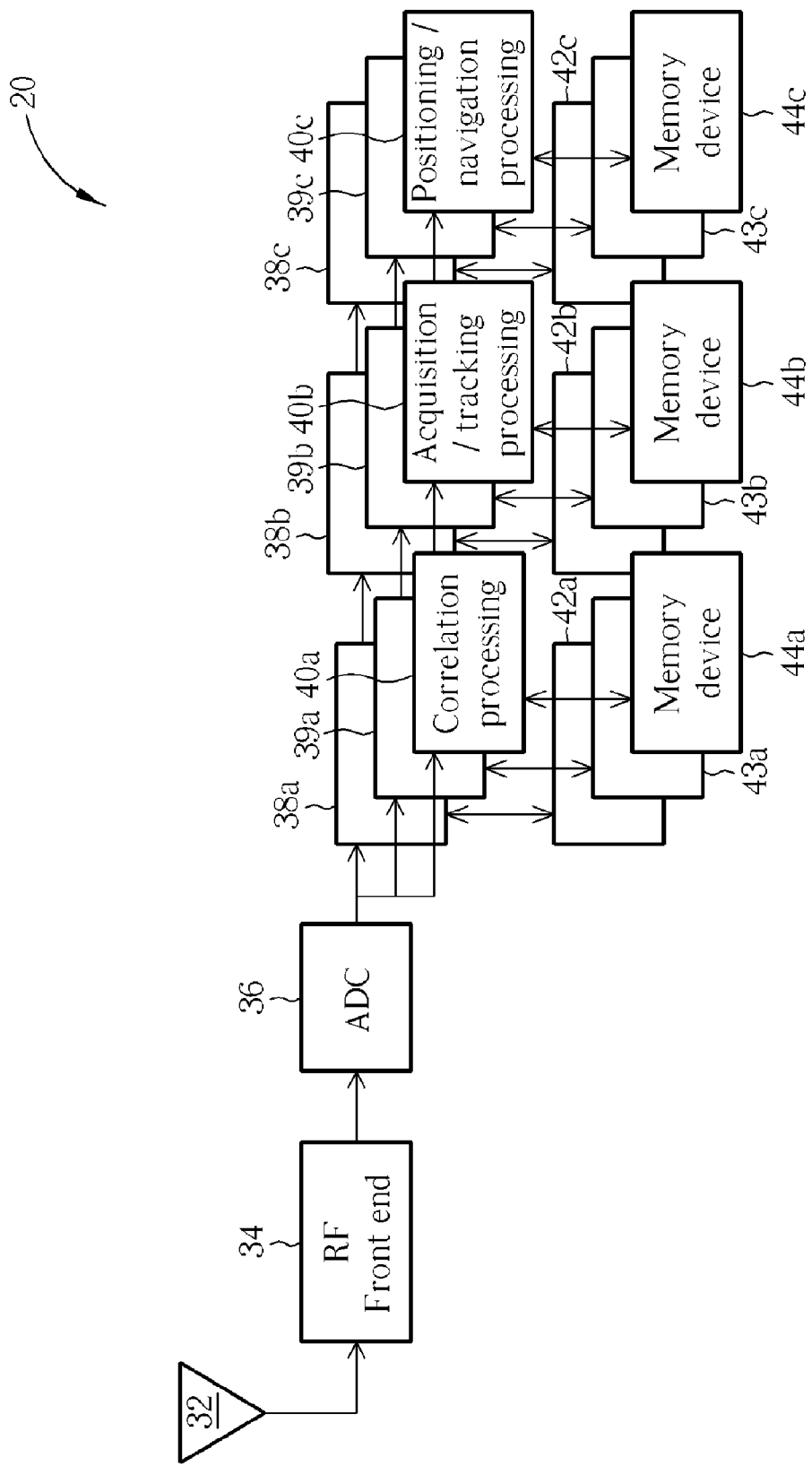
FIG. 2 is a block diagram illustrating a second conventional GNSS receiver.
Figure 3:
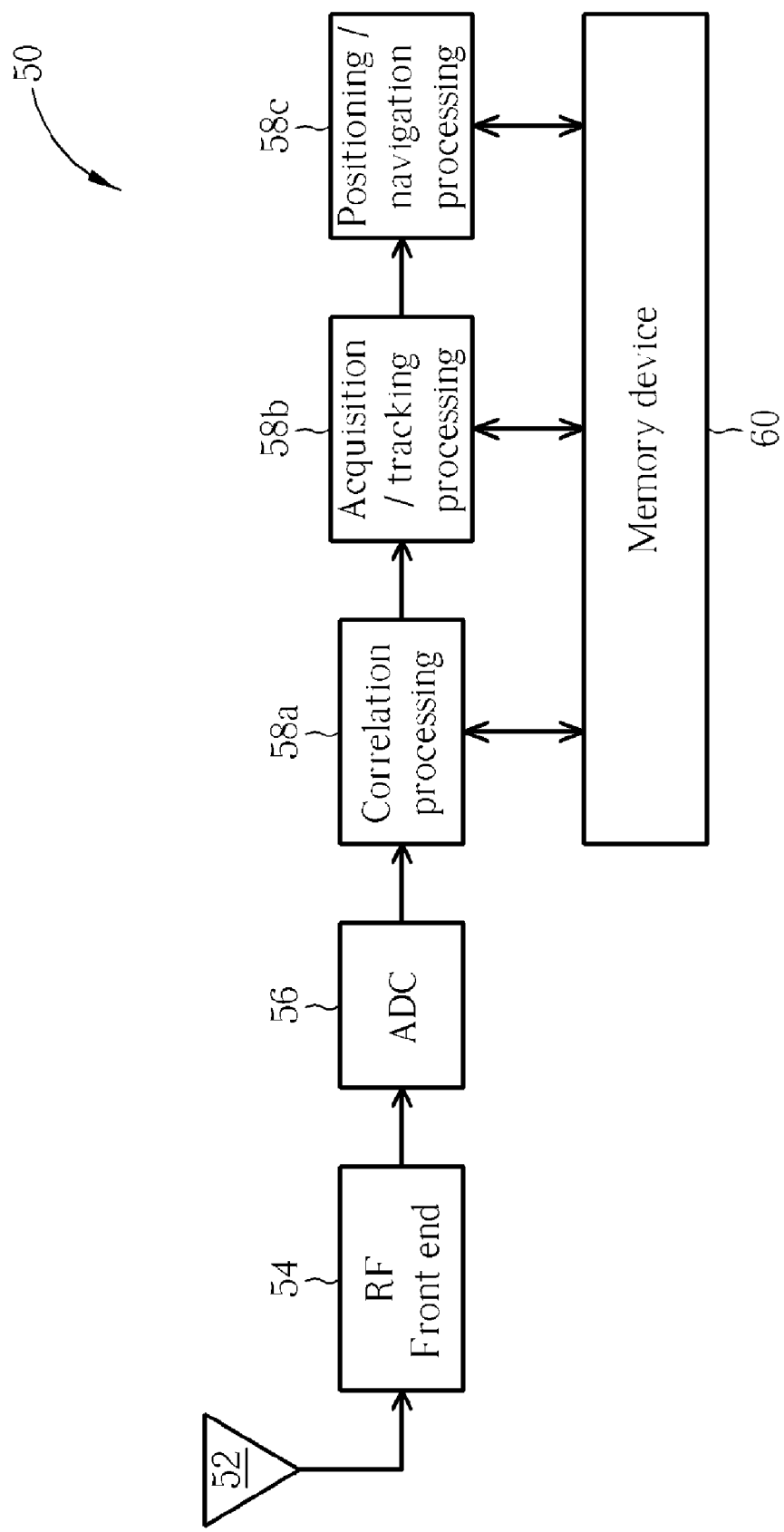
FIG. 3 is a block diagram illustrating a third conventional GNSS receiver.
Figure 4:
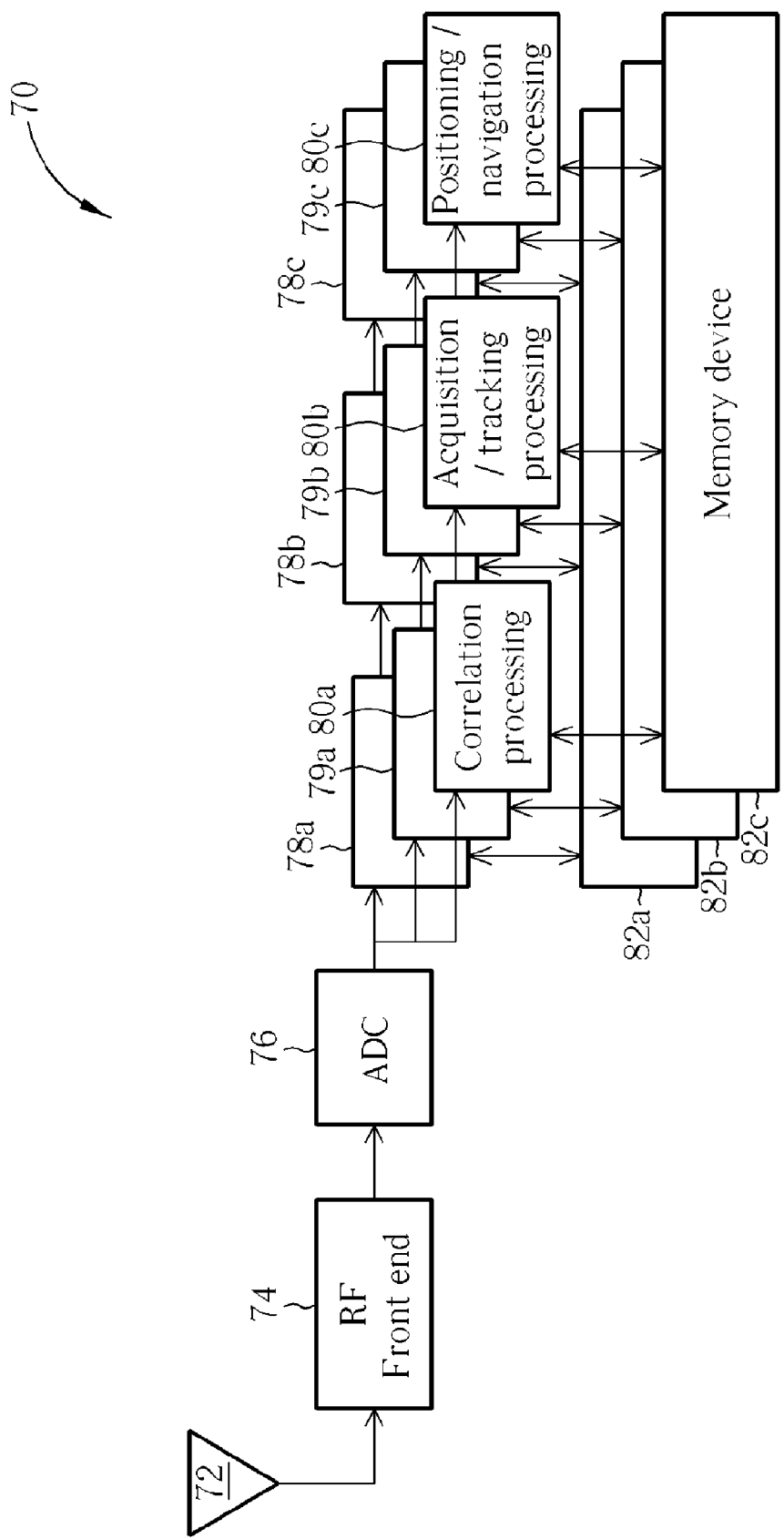
FIG. 4 is a block diagram illustrating a fourth conventional GNSS receiver.
Figure 5:
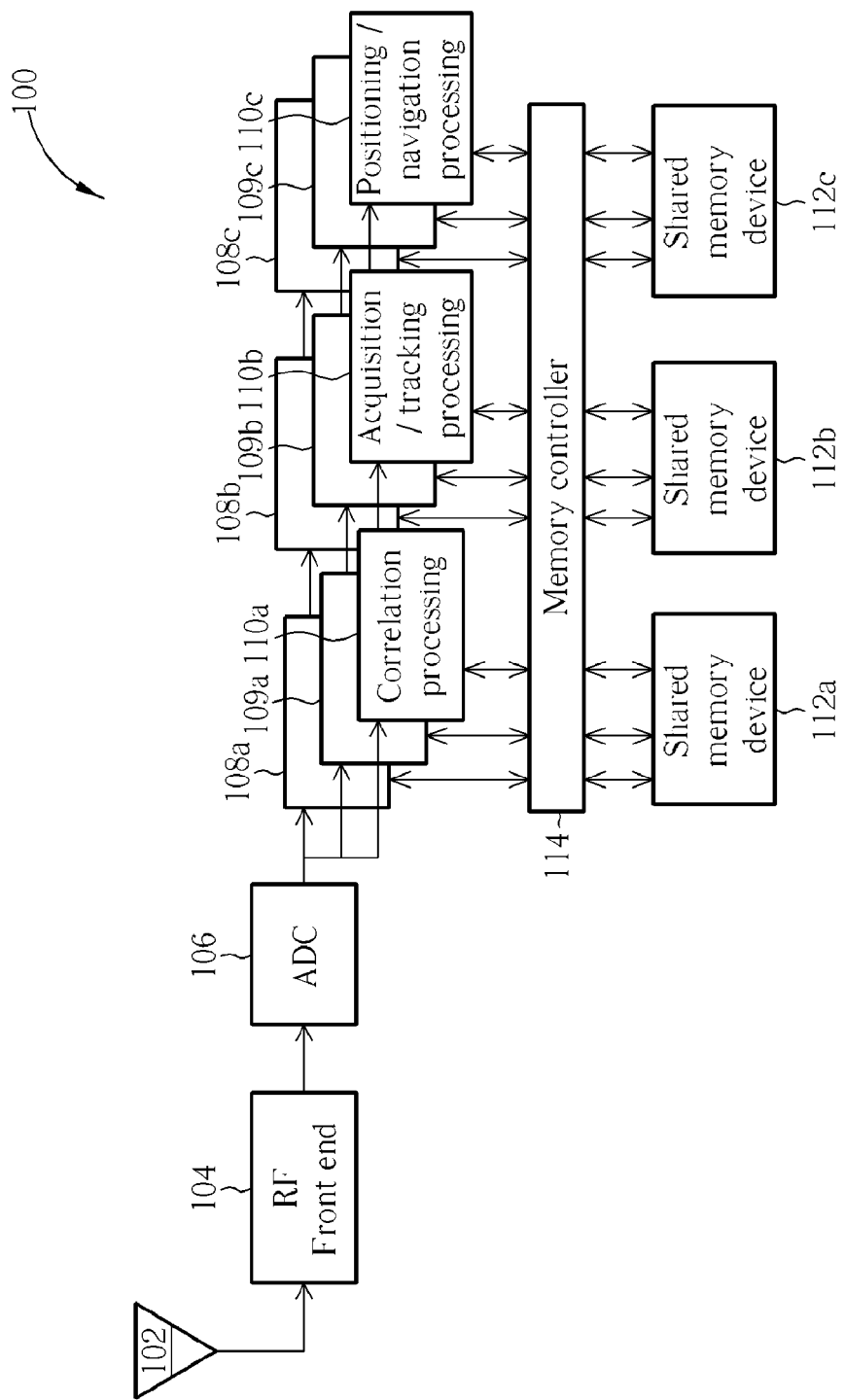
FIG. 5 is a block diagram illustrating a GNSS receiver according to a first embodiment of the present invention.

Please refer to FIG. 5. FIG. 5 is a block diagram illustrating a GNSS receiver 100 according to a first embodiment of the present invention. The GNSS receiver 100 comprises an antenna 102, an RF front end 104, an ADC 106, a plurality of functional stages 108a, 109a, 110a performing correlation processing, a plurality of functional stages 108b, 109b, 110b performing acquisition/tracking processing, a plurality of functional stages 108c, 109c, 110c performing positioning/navigation processing, and a plurality of shared memory devices 112a, 112b, 112c. Please note that components of the same name in FIG. 1 and FIG. 5 have identical operation and functionality, and further description is omitted here for the sake of brevity. In this exemplary embodiment, the shared memory device 112a is allocated to be commonly shared by functional stages 108a, 109a, 119a corresponding to the same signal processing function (i.e., the correlation processing for coherent/incoherent integration in time domain or frequency domain); the shared memory device 112b is allocated to be commonly shared by functional stages 108b, 109b, 110b corresponding to the same processing function (i.e., the acquisition/tracking processing); and the shared memory device 112c is allocated to be commonly shared by functional stages 108c, 109c, 110c corresponding to the same signal processing function (i.e., the positioning/navigation processing). In addition, the GNSS receiver 100 is designed to support multiple GNSS systems. For example, a signal processing chain including the functional stages 108a, 108b, 108c is implemented for processing signals from the first GNSS system (e.g., GPS); a signal processing chain including the functional stages 109a, 109b, 109c is implemented for processing signals from the second GNSS system (e.g., Galileo); and a signal processing chain including the functional stages 110a, 110b, 110c is implemented for processing signals from the third GNSS system (e.g., GLONASS).

It should be note that the GNSS systems supported by the GNSS receiver 100 of the present invention are not limited to above-mentioned GPS system, Galileo system, and GLONASS system. Additionally, the aforementioned GPS system supported by the GNSS receiver 100 also includes the Satellite Based Augmentation System (SBAS), such as the Wide Area Augmentation System (WAAS). Moreover, the present invention is not limited to apply the disclosed shared memory architecture to different GNSS systems complying with different satellite navigation categories. Taking the GPS system for example, it is capable of utilizing different channels having different carrier frequencies to transmit signals. In other words, signals transmitted from a GPS system through a first carrier frequency and signals transmitted from the same GPS system through a second carrier frequency are regarded as signals transmitted from different GNSS systems in the present invention. For example, the signal processing chain including the functional stages 108a, 108b, 108c is configured to processing signals transmitted via a carrier frequency L1 of the GPS system, while the signal processing chain including the functional stages 109a, 109b, 109c is configured to processing signals transmitted via another carrier frequency L2 of the GPS system. These all obey the spirit of the present invention and fall in the scope of the present invention.

As shown in FIG. 5, the GNSS receiver 100 further comprises a memory controller 114 implemented to control memory sharing of each shared memory device 112a, 112b, 112c. In the present embodiment, the memory controller 114 is configured for dynamically allowing a first functional stage (e.g., the functional stage 108a) to access the memory space of the shared memory device 112a before all possible satellite(s) of the first GNSS system (e.g., GPS) visible to the GNSS receiver 100 are tried, and allowing a second functional stage (e.g., the functional stage 109a) to access the memory space of the shared memory device 112a when all possible satellite(s) of the first GNSS visible to the GNSS receiver 100 are tried and the allocated memory space is not fully occupied yet. The operation is detailed as below.

Figure 6:
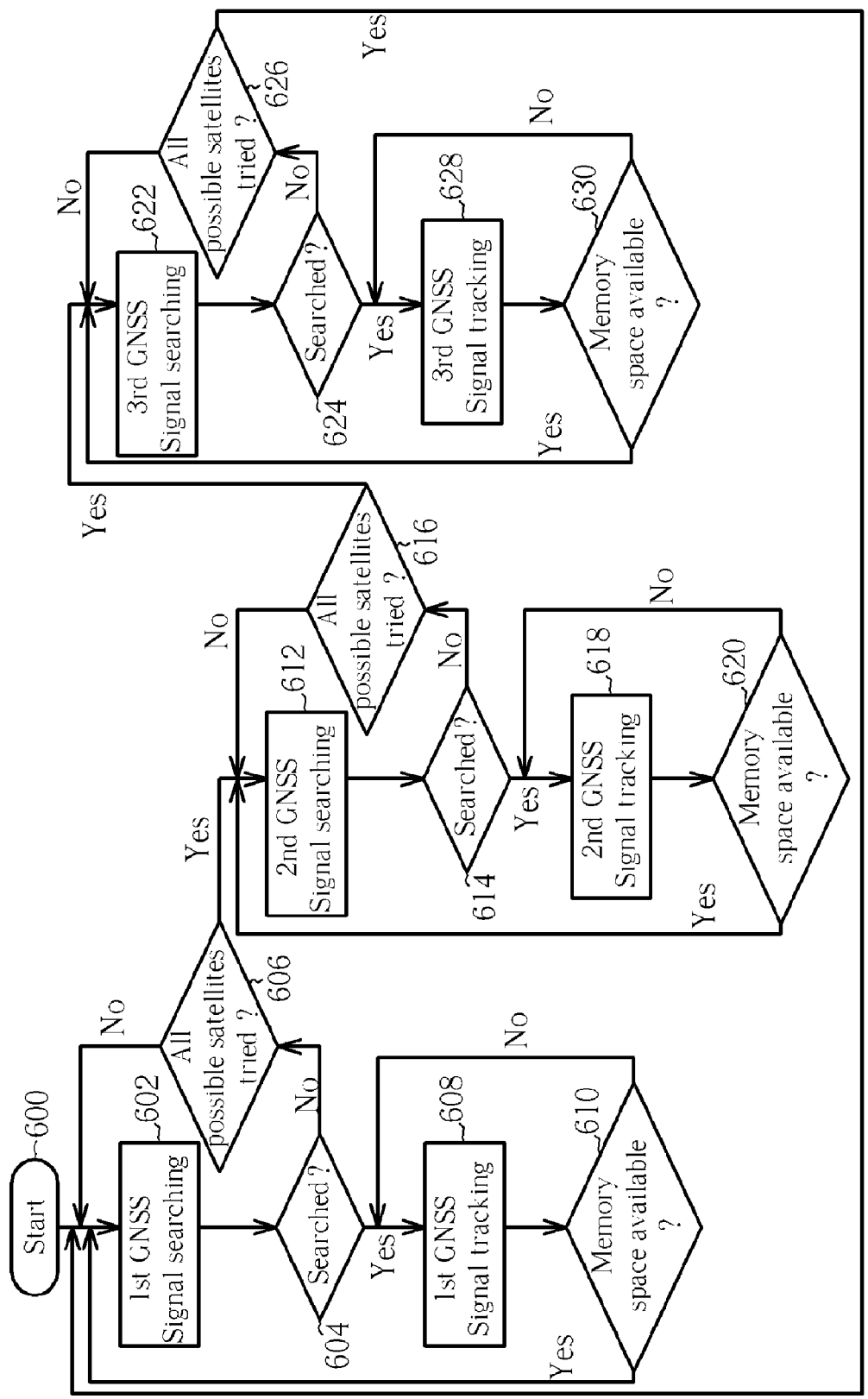
FIG. 6 is a flowchart illustrating the operation of the receiver system shown in FIG. 5 according to an embodiment of the present invention.

Please refer to FIG. 6. FIG. 6 is a flowchart illustrating the operation of the receiver system 100 shown in FIG. 5 according to an embodiment of the present invention. The receiver system 100 operates according to following steps:

Step 600: Start.

Step 602: Perform signal search (correlation and signal acquisition) for the first GNSS system (e.g., GPS).

Step 604: Is signal there? If yes, go to step 608; otherwise, go to step 606.

Step 606: Are all of the possible satellites of the first GNSS system visible to a GNSS receiver tried? If yes, go to step 612; otherwise, go to step 602.

Step 608: Perform tracking processing and obtain desired positioning information.

Step 610: Is there free memory space available for data storage? If yes, go to step 602 for searching signals from other satellites of the first GNSS system; otherwise, go to step 608.

Step 612: Perform signal search (correlation and signal acquisition) for the second GNSS system (e.g., Galileo).

Step 614: Is signal there? If yes, go to step 618; otherwise, go to step 616.

Step 616: Are all of the possible satellites of the second GNSS system visible to the GNSS receiver tried? If yes, go to step 622; otherwise, go to step 612.

Step 618: Perform tracking processing and obtain desired positioning information.

Step 620: Is there free memory space available for data storage? If yes, go to step 622 for searching signals from other satellites of the second GNSS system; otherwise, go to step 618.

Step 622: Perform signal search (correlation and signal acquisition) for the third GNSS system (e.g., GLONASS).

Step 624: Is signal there? If yes, go to step 628; otherwise, go to step 626.

Step 626: Are all of the possible satellites of the third GNSS system visible to the GNSS receiver tried? If yes, go to step 602; otherwise, go to step 622.

Step 628: Perform tracking processing and obtain desired positioning information.

Step 630: Is there free memory space available for data storage? If yes, go to step 622; otherwise, go to step 628.

As clearly illustrated in FIG. 6, the first GNSS system has highest priority, and the third GNSS system has lowest priority. Therefore, as the receiver system 100 is started up, signals from satellites of the first GNSS system are first searched and tracked to provide desired positioning information. Sometimes, it is possible that the geometric positions of the visible satellites in the first GNSS system are not good. Using positioning information given from satellites of other GNSS systems (i.e., the second and third GNSS systems) might be very helpful to the positioning accuracy of the GNSS receiver. In the present invention, if the shared memory is not full yet, it could be used to store processing data of other GNSS systems. For example, the memory controller 114 allows the shared memory devices 112a and 112b to be accessed by respective functional stages 108a and 108b before all possible satellites of the first GNSS system visible to the receiver system 100 are tried. When all possible satellites of the first GNSS system visible to the receiver system 100 have been tried and the memory spaces of the shared memory devices 112a and 112b are not fully occupied by processing data of the first GNSS system, the memory controller 114 allows the shared memory devices 112a and 112b to be accessed by respective functional stages 109a and 109b before all possible satellites of the second GNSS system visible to the receiver system 100 are tried. Similarly, when all possible satellites of the second GNSS system visible to the receiver system 100 have been tried and the memory spaces of the shared memory devices 112a and 112b are not fully occupied by processing data of the first and second GNSS systems, the memory controller 114 allows the shared memory device 112a and 112b to be accessed by respective functional stages 110a and 110b before all possible satellites of the third GNSS system visible to the receiver system 100 are tried. In short, the memory space in the shared memory device is dynamically allocated to the functional stages of different GNSS systems, depending upon the remaining storage capacity available in the shared memory device. In this way, since the allotment of the memory space in a shared memory device for functional stages of different GNSS systems is not pre-defined and fixed, the utilization efficiency of the shared memory architecture is improved due to the dynamical memory allotment controlled by the memory controller 114.

It should be noted that priority of the GNSS systems can be set by a predetermined order, received signal strength, or receiver location, depending upon design requirements. Additionally, since the priority of the first GNSS system (e.g., GPS) is higher than that of the second and third GNSS systems, if signals from new possible satellites of the first GNSS system appear during the signal processing for signals from satellites of the second or third GNSS system, the flow goes back to step 602 to process any signals from newly found satellites of the first GNSS system. In addition, after the processing of signals from newly found satellites of the first GNSS system, those previously tracked signals from the currently visible satellites of the first, second, and third GNSS systems are not re-acquired and re-tracked through the correlation processing and acquisition/tracking processing unless they are lost. Furthermore, the steps shown in FIG. 6 are for illustrative purposes only, and are not meant to be limitations of the present invention. That is, suppose that the result is substantially the same. In other embodiments, new steps can be added to the flow shown in FIG. 6 and the steps in FIG. 6 are not limited to be executed according to the exact order shown in FIG. 6.

Figure 7:
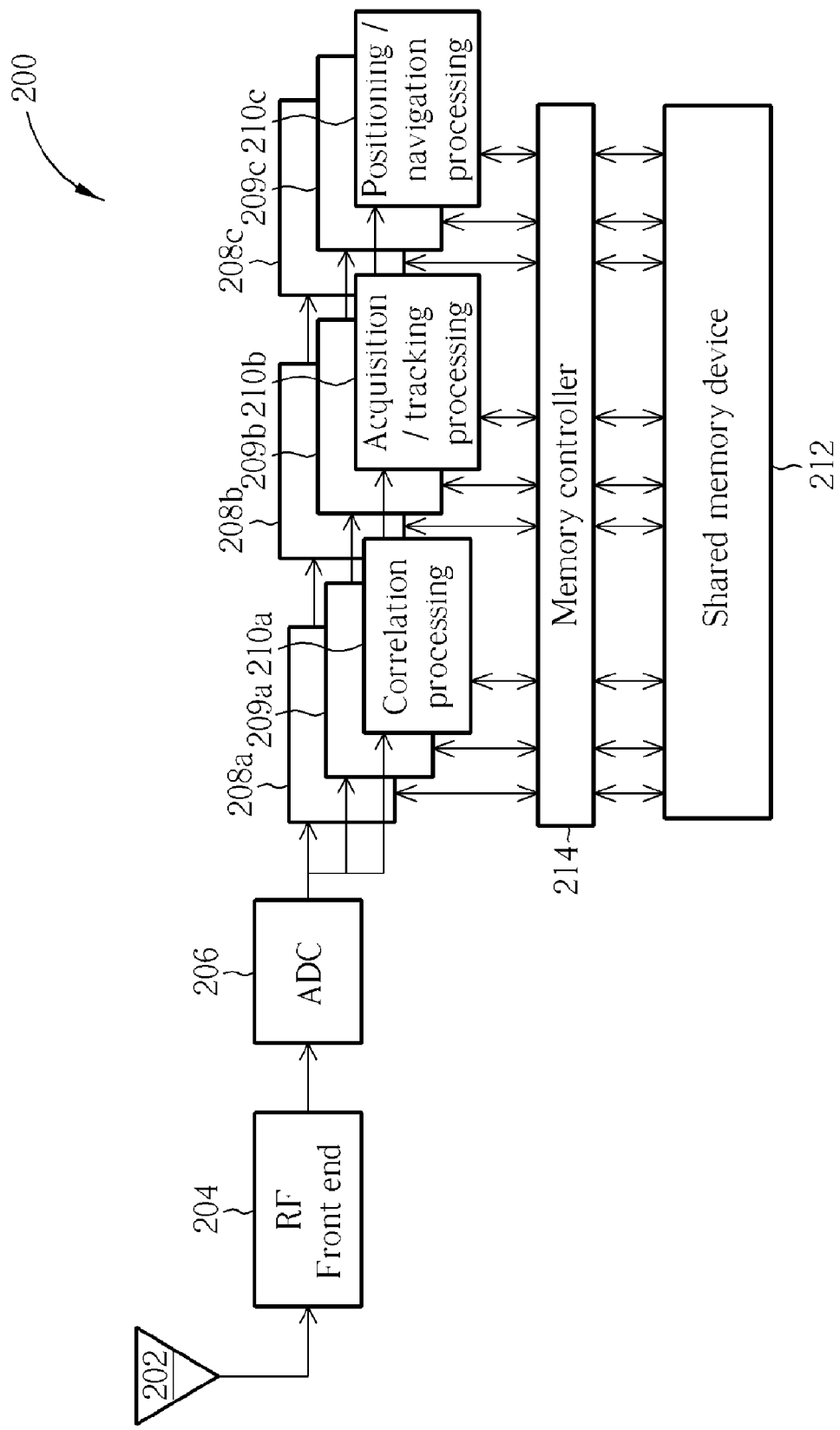
FIG. 7 is a block diagram illustrating a GNSS receiver according to a second embodiment of the present invention.

Please refer to FIG. 7. FIG. 7 is a block diagram illustrating a GNSS receiver 200 according to a second embodiment of the present invention. The GNSS receiver 200 comprises an antenna 202, an RF front end 204, an ADC 206, a plurality of functional stages 208a, 209a, 210a performing correlation processing, a plurality of functional stages 208b, 209b, 210b performing acquisition/tracking processing, a plurality of functional stages 208c, 209c, 210c performing positioning/navigation processing, a shared memory device 212, and a memory controller 214. Please note that components of the same name in FIG. 5 and FIG. 7 have identical operation and functionality, and further description is omitted for brevity. In this exemplary embodiment, the shared memory device 212 serves as a memory pool allocated to all of the functional stages 208-210a, 208b-210b, 208c-210c, thereby providing a highest utilization efficiency of memory space for data storage. As shown in FIG. 7, the GNSS receiver 200 is designed to support multiple GNSS systems. For example, a signal processing chain including the functional stages 208a, 208b, 208c is implemented for processing signals from the first GNSS system (e.g., GPS); a signal processing chain including the functional stages 209a, 209b, 209c is implemented for processing signals from the second GNSS system (e.g., Galileo); and a signal processing chain including the functional stages 210a, 210b, 210c is implemented for processing signals from the third GNSS system (e.g., GLONASS). In this embodiment, a memory space in the shared memory device 212 is allowed to be commonly shared by functional stages corresponding to different processing functions in different GNSS systems. For example, the functional stages 208a, 290b, and 210c share the same memory space allocated in the shared memory device 212. However, this is for illustrative purposes only, and is not meant to be a limitation of the present invention. In other words, after understanding above disclosure, a skilled person would readily appreciate that other alternative memory sharing designs of the shared memory device 212 are possible.

Figure 8:
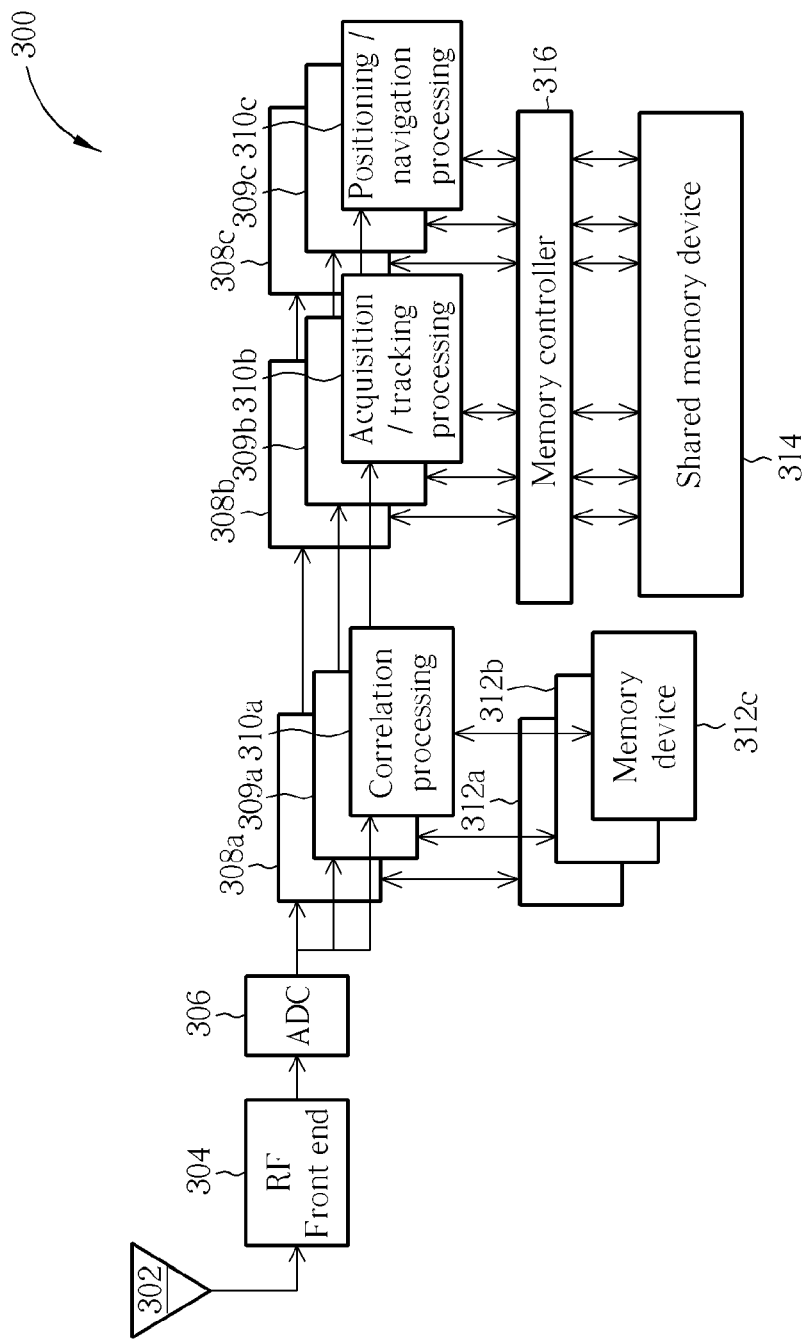
FIG. 8 is a block diagram illustrating a GNSS receiver according to a third embodiment of the present invention.

Please refer to FIG. 8. FIG. 8 is a block diagram illustrating a GNSS receiver 300 according to a third embodiment of the present invention. The GNSS receiver 300 comprises an antenna 302, an RF front end 304, an ADC 306, a plurality of functional stages 308a, 309a, 310a performing correlation processing, a plurality of functional stages 308b, 309b, 310b performing acquisition/tracking processing, a plurality of functional stages 308c, 309c, 310c performing positioning/navigation processing, a plurality of memory devices 312a, 312b, 312c, a shared memory device 314, and a memory controller 316. Please note that components of the same name in FIG. 5 and FIG. 8 have identical operation and functionality, and further description is omitted for brevity. In this embodiment, because the correlation processing requires a large amount of data processing, the functional stages 308a, 309a, 310a performing correlation processing are implemented by hardware circuits and the memory devices 312a, 312b, 312c are dedicated to the respective functional stages 308a, 309a, 310a accordingly. In other words, there is no shared memory architecture implemented for the correlation processing. However, as to the acquisition/tracking processing and the positioning/navigation processing, the shared memory architecture similar to that shown in FIG. 7 is implemented. For example, the functional stages 308b-310b, 308c-310c are implemented by a processor, such as a digital signal processor (DSP). In this way, the processor uses the shared memory device 314 for storing processing data when executing program codes to perform the acquisition/tracking processing and the positioning/navigation processing for different GNSS systems.

Briefly summarized, the disclosed shared memory architecture is implemented by configuring the receiver system to have a first functional stage and a second functional stage for processing information carried by signals from a first transmitter system and a second transmitter system respectively; allocating a memory space to be commonly shared by the first functional stage and the second functional stage; and buffering processing data generated from the first functional stage or the second functional stage into the memory space.

Additionally, the disclosed memory allocation scheme further includes dynamically allowing the first functional stage to access the memory space before all possible satellite(s) of the first global navigation satellite system visible to the receiver system are tried, and allowing the second functional stage to access the memory space when all possible satellite(s) of the first global navigation satellite system visible to the receiver system are tried and the memory space is not fully occupied.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shared memory device for a receiver system, the receiver system configured to have a first functional stage and a second functional stage for processing information carried by signals from a first transmitter system and a second transmitter system respectively, the shared memory device comprising:
    a memory space, allocated to be commonly shared by the first functional stage and the second functional stage, for buffering processing data generated from the first functional stage or the second functional stage,
    wherein the first transmitter system is a first global navigation satellite system, and the second transmitter system is a second global navigation satellite system.

2. The shared memory device of claim 1, wherein the first functional stage and the second functional stage correspond to an identical signal processing function.

3. The shared memory device of claim 2, wherein the identical signal processing function is selected from a group consisting of a correlation processing, an acquisition/tracking processing, and a positioning/navigation processing.

4. The shared memory device of claim 2, further comprising:
    a memory controller, coupled to the memory space, for dynamically allowing the first functional stage to access the memory space before all possible satellite(s) of the first global navigation satellite system visible to the receiver system are tried, and allowing the second functional stage to access the memory space when all possible satellite(s) of the first global navigation satellite system visible to the receiver system are tried and the memory space is not fully occupied.

5. The shared memory device of claim 1, wherein the first functional stage and the second functional stage correspond to different signal processing functions.

6. The shared memory device of claim 5, wherein the different signal processing functions are selected from a group consisting of a correlation processing, an acquisition/tracking processing, and a positioning/navigation processing.

7. The shared memory device of claim 5, further comprising:
    a memory controller, coupled to the memory space, for dynamically allowing the first functional stage to access the memory space before all possible satellite(s) of the first global navigation satellite system for the receiver system are tried, and allowing the second functional stage to access the memory space when all possible satellite(s) of the first global navigation satellite system for the receiver system are tried and the memory space is not fully occupied.

8. The shared memory device of claim 1, further comprising:
    a memory controller, coupled to the memory space, for dynamically allowing the first functional stage to access the memory space before all possible satellite(s) of the first global navigation satellite system for the receiver system are tried, and allowing the second functional stage to access the memory space when all possible satellite(s) of the first global navigation satellite system for the receiver system are tried and the memory space is not fully occupied.

9. A memory allocation method applied to a receiver system, comprising:
    (a) configuring the receiver system to have a first functional stage and a second functional stage for processing information carried by signals from a first transmitter system and a second transmitter system respectively;
    (b) allocating a memory space to be commonly shared by the first functional stage and the second functional stage; and
    (c) buffering processing data generated from the first functional stage or the second functional stage into the memory space,
    wherein step (a) comprises:
    configuring the receiver system to utilize the first functional stage to process information carried by signals from a first global navigation satellite system; and configuring the receiver system to utilize the second functional stage to process information carried by signals from a second global navigation satellite system.

10. The method of claim 9, wherein step (a) further comprises:
configuring the first functional stage and the second functional stage to have an identical signal processing function.

11. The method of claim 10, wherein the identical signal processing function is selected from a group consisting of a correlation processing, an acquisition/tracking processing, and a positioning/navigation processing.

12. The method of claim 10, further comprising:
dynamically allowing the first functional stage to access the memory space before all possible satellite(s) of the first global navigation satellite system visible to the receiver system are tried, and allowing the second functional stage to access the memory space when all possible satellite(s) of the first global navigation satellite system visible to the receiver system are tried and the memory space is not fully occupied.

13. The method of claim 9, wherein step (a) further comprises:
configuring the first functional stage and the second functional stage to have different signal processing functions.

14. The method of claim 13, wherein the different signal processing functions are selected from a group consisting of a correlation processing, an acquisition/tracking processing, and a positioning/navigation processing.

15. The method of claim 13, further comprising:
dynamically allowing the first functional stage to access the memory space before all possible satellite(s) of the first global navigation satellite system for the receiver system are tried, and allowing the second functional stage to access the memory space when all possible satellite(s) of the first global navigation satellite system for the receiver system are tried and the memory space is not fully occupied.

16. The method of claim 9, further comprising:
dynamically allowing the first functional stage to access the memory space before all possible satellite(s) of the first global navigation satellite system for the receiver system are tried, and allowing the second functional stage to access the memory space when all possible satellite(s) of the first global navigation satellite system for the receiver system are tried and the memory space is not fully occupied.

* * * * *